(12) United States Patent
Brand et al.

(10) Patent No.: US 10,776,711 B2
(45) Date of Patent: Sep. 15, 2020

(54) COMPUTE INTENSIVE STREAM PROCESSING

(71) Applicant: Pivotal Software, Inc., Palo Alto, CA (US)

(72) Inventors: Michael Brand, Victoria (AU); Lyndon John Adams, London (GB); David Russell Brown, San Marcos, CA (US); Kee Siong Ng, Singapore (SG)

(73) Assignee: Pivotal Software, Inc., San Francisco, CA (US)

( * ) Notice: Subject to any disclaimer, the term of this patent is extended or adjusted under 35 U.S.C. 154(b) by 502 days.

(21) Appl. No.: 14/710,098

(22) Filed: May 12, 2015

(65) Prior Publication Data

US 2016/0071025 A1 Mar. 10, 2016

Related U.S. Application Data

(60) Provisional application No. 62/047,604, filed on Sep. 8, 2014, provisional application No. 62/148,715, filed on Apr. 16, 2015.

(51) Int. Cl.
*G06N 20/00* (2019.01)
*G06N 5/02* (2006.01)
*H04L 12/751* (2013.01)
*G06N 5/04* (2006.01)

(52) U.S. Cl.
CPC .............. *G06N 20/00* (2019.01); *G06N 5/02* (2013.01); *G06N 5/04* (2013.01); *H04L 45/08* (2013.01)

(58) Field of Classification Search
CPC ............................ G06N 99/005; G06N 20/00
See application file for complete search history.

(56) References Cited

U.S. PATENT DOCUMENTS

| | | | |
|---|---|---|---|
| 4,757,442 A * | 7/1988 | Sakata | G06F 11/1658 |
| | | | 702/89 |
| 5,249,297 A | 9/1993 | Brockmann | |
| 5,276,771 A | 1/1994 | Manukian et al. | |
| 5,285,381 A | 2/1994 | Lskarous et al. | |
| 5,444,819 A | 8/1995 | Negishi et al. | |
| 5,870,735 A | 2/1999 | Agrawal et al. | |

(Continued)

OTHER PUBLICATIONS

International Search Report and Written Opinion in International Application No. PCT/US2015/048979, dated Jan. 7, 2016, 11 pages.

(Continued)

*Primary Examiner* — Ben M Rifkin
(74) *Attorney, Agent, or Firm* — Fish & Richardson P.C.

(57) ABSTRACT

Methods, systems, and apparatus, including computer programs encoded on computer storage media, for stream processing. One method includes receiving an event stream of events by a first plurality of local modelers of a stream processing system. Each local modeler processes a portion of received events of the event stream according to a first set of operations, the operations including aggregating information associated with each event to generate aggregated information. One or more local modelers provide, to a first central modeler executing on the system, the respective aggregated information generated by one or more of the local modelers. A set of parameters of a respective machine learning model is determined using the received aggregated information.

18 Claims, 9 Drawing Sheets

(56) References Cited

U.S. PATENT DOCUMENTS

| | | | |
|---|---|---|---|
| 5,909,681 A * | 6/1999 | Passera | G06F 9/5027 |
| 6,458,060 B1 * | 10/2002 | Watterson | A63B 22/0235 |
| | | | 482/4 |
| 7,577,726 B1 | 8/2009 | Conard | |
| 7,860,822 B1 | 12/2010 | Weinberger et al. | |
| 8,768,870 B1 | 7/2014 | Corrado et al. | |
| 2002/0082886 A1 | 6/2002 | Manganaris et al. | |
| 2005/0058242 A1 * | 3/2005 | Peschmann | G01R 27/06 |
| | | | 378/57 |
| 2005/0278322 A1 * | 12/2005 | Fan | G06N 99/005 |
| 2007/0220034 A1 | 9/2007 | Iyer | |
| 2007/0239535 A1 | 10/2007 | Koran | |
| 2009/0037370 A1 | 2/2009 | Mishra et al. | |
| 2009/0171999 A1 | 7/2009 | McColl et al. | |
| 2010/0091305 A1 * | 4/2010 | Mo | H04N 1/6033 |
| | | | 358/1.9 |
| 2012/0291049 A1 | 11/2012 | Park et al. | |
| 2013/0014094 A1 | 1/2013 | Chkodrov et al. | |
| 2013/0031567 A1 | 1/2013 | Nano et al. | |
| 2013/0339375 A1 | 12/2013 | Adayikkoth | |
| 2014/0019508 A1 | 1/2014 | Sato et al. | |
| 2015/0134626 A1 | 5/2015 | Theimer et al. | |
| 2015/0169786 A1 | 6/2015 | Jerzak et al. | |
| 2015/0193697 A1 | 7/2015 | Vasseur et al. | |
| 2016/0071011 A1 | 3/2016 | Brand et al. | |
| 2016/0071014 A1 | 3/2016 | Brand et al. | |
| 2016/0071026 A1 | 3/2016 | Brand et al. | |
| 2016/0071027 A1 | 3/2016 | Brand et al. | |

OTHER PUBLICATIONS

Garbled Notes "Differences between L1 and L2 as Loss Function and Regularization," [online] https://web.archive.org/web/20140328055117/http://www.chioka.in/differences-between-11-and-12-as-loss-function-and-regularization/, Mar. 28, 2014, retrieved Aug. 3, 2017, 4 pages.

Cohen et al., "Mad Skills: New Analysis Practices for Big Data," VLDB '09, Aug. 24-28, 2009, 12 pages http://db.cs.berkeley.edu/papers/vldb09-madskills.pdf>.

Cutting et al., "Scatter/Gather: A Cluster-based Approach to Browsing Large Document Collections," 15th Ann Int'l SIGIR '92, 1992, pp. 318-329.

Liew et al. "Mixed learning algorithms and features ensemble in hepatotoxicity prediction," Journal of Computer-Aided Molecular Design, Sep. 6, 2011, 17 pages.

EPO Result of Consultation issued in European Application No. 15771805.7 dated Dec. 2, 2019, 3 pages.

\* cited by examiner

COMPUTE INTENSIVE STREAM PROCESSING

CROSS-REFERENCE TO RELATED APPLICATIONS

This application claims the benefit under 35 U.S.C. § 119(e) of the filing date of U.S. Patent Application Ser. No. 62/047,604, filed Sep. 8, 2014, titled "PARALLEL STRUCTURED STREAM PROCESSING" and of U.S. Patent Application Ser. No. 62/148,715, filed Apr. 16, 2015, titled "STREAM PROCESSING". The entire contents of the prior applications are hereby incorporated by reference.

BACKGROUND

This specification relates to stream processing.

Stream processing refers to systems and techniques for continually processing unbounded sequences of data objects, e.g., events, in real time, i.e., a sequence that is not limited to a predetermined number of data objects or rate of arrival of data objects; such a sequence is referred to as a stream. For example, a stream of objects may represent page requests received by a web site, telemetry events from sensors, or microblog messages posted by users. Stream processing systems can perform a variety of tasks, including providing immediate search results as data objects are found and continually processing new data objects as they are received.

SUMMARY

This specification describes a number of novel technologies that can be used separately or in combinations to implement a scalable framework for fast data analytics in the context of stream processing. In stream processing, a stream of data is pushed through several types of desired transformations. This paradigm can result in fast data processing, because the split stream can be transformed in parallel by several computing nodes, each implementing a transformation pipeline over a small part of the data stream. In stream processing, each computation node sees a small portion of the data that may not be representative of the whole.

One technology is a framework that allows fast-data computation-intensive processing, e.g., machine learning. This is accomplished by breaking up each computational algorithm: algorithms are separated into (i) highly parallel parts, (ii) aggregation of data, and (iii) compute-intensive-but-data-light parts. Aggregation of data is a two-stage process; it is separated into (ii.1) aggregation within a compute node, and (ii.2) aggregation between compute nodes.

In the framework, an algorithm is implemented in the form of one or more pairs of operating components that will be referred to as "local modelers" (LMs) and "central modelers" (CMs). The LMs implement parts (i) and (ii.1) whereas the CMs implement parts (ii.2) and (iii).

The resulting architecture is a hybrid set-up in which:

LMs are arranged in a pipeline and implement the stream-processing paradigm: data is sharded and each shard is passed through one of several identical copies of the pipeline. In this way, data-intensive portions can be handled.

LMs communicate with CMs by scatter-gathering: the LMs compute aggregates partially, by aggregating over only the data that they see; they then communicate their data to a shared CM, which can, at this point, perform a second stage of the aggregation and thus compute an aggregated result over the entire data.

A CM uses the aggregation result and others like it as inputs to the compute-intensive-but-data-light portion of the computation. The aggregated results or any other computation result that is relevant to the LMs can then be communicated back to the LMs. CMs can communicate with each other in any way the system developer desires, as the CMs are not data intensive. In effect, they can implement a grid-processing paradigm.

Another technology is an implementation of real-time modeling and scoring for online machine learning algorithms, which can be based on this framework. Essentially, the aggregation functionality is used in order to learn the various required statistics over the data that is streamed in parallel through the LMs. The statistics are ultimately computed in a CM. The CM can then use these statistics in order to optimize the parameters for a desired machine learning model. The model parameters are then communicated back to the LMs. These, in turn, can perform scoring, e.g. for prediction, of incoming data events by use of the communicated model.

Machine learning algorithms are algorithms that determine a specific model from a family of models, based on evidence that is given to the algorithms as input. The family of models is inherent to the algorithm and is a parametric family. The output model is specified by its set of parameters. Machine learning algorithms may have additional outputs, e.g., the algorithm's confidence in the model.

The basic underlying idea is that a model is chosen in a way that best fits the available data. The exact same mechanism can be used to take new evidence and compare its fit against an existing model. This is referred to as scoring.

The process of building a model on the fly from incoming data is usually computationally intensive. For this reason, it is advantageous to split the algorithm creating the model architecturally into several components, as described above and referred to in this specification as central modelers and local modelers.

In some implementations of the framework, the machine learning model is developed off line and injected into the LMs either directly or through one or more CMs. Another technology handles situations in which analytics performed on an event requires data external to the event. For example, determining if a call from a particular mobile number was really initiated by the legitimate owner of the mobile device it is not enough to have details regarding the call: one must also have details regarding the device's owner. Typically, one cannot make use of such external data in fast-data analysis, especially when low-latency response is required, because it takes too long to send the data to the compute node where the relevant algorithm, typically the LM, executes. This technology solves the problem by using a framework that allows the sharding of data to be done over user-defined keys. In terms of the example just given, call information can be routed to an LM based on, for example, the call's mobile number. The same mobile number will always be routed to the same LM, regardless of how many copies of this LM are present elsewhere in the system. Consequently, one can store in the same node any external information relevant to this mobile number, e.g., relevant details regarding its owner. This architecture allows scoring to be done with use of external data, but without needing to communicate any of the external data between LM nodes in real time.

An aspect of this technology handles situations in which analytics requires several different types of external data to be handled in the course of the same computation. For example, the example above can be enhanced further by taking into account details of the owner of the device being called. The architecture accommodates this by allowing not just one sharding process, but also rerouting between LMs in the pipeline. For example, the system can route the call by the originating number, process in an LM any indications of fraud based on the originating number, then reroute by the called number and process in another LM any indications of fraud based on the called number. Ultimately, the system is able to determine the call's legitimacy based on both indicators without requiring massive data movements between compute nodes.

Another technology allows a system to perform online data modeling where reality is in perpetual flux and late reaction is costly. This technology introduces into the framework described above a learning rate parameter that discounts older data. In some implementations this is done by piping a timestamp through the system with any new event. Older data can be discounted as part of the aggregation process already in the LMs. By altering the learning rate parameter, a system developer can set the machine learning model to either be more stable, i.e., suspicious of recent data, which may be noisy, or more agile, i.e., suspicious of older data, which may be out of date. This allows tuning the algorithm by accommodating to beliefs about the rate in which the underlying reality changes or by taking into account stability and agility needs.

Another technology allows a system to trigger an alert when a sudden shift occurs. For example, a system may need to flag trending words in social media, and the earlier this flagging can be done the better. This is done by having two identical algorithms simultaneously model the data based on incoming events, where the only difference between the two algorithms is that they are given distinct learning-rate parameters. By comparing the output of the two algorithms and measuring the "concept drift" between their two models, trends and changes in trends can be detected. At any given time point T, the algorithms model the system based on the data they have seen, i.e., it captures the state of the system at time T-A. Varying the learning rate results in a different A, larger for a stable model, smaller for an agile model. Comparing the two results is akin to taking the derivative, and thus akin to measuring the rate of change. A developer may implement the same system but with more copies of the basic algorithm in order to measure higher-order derivatives A second-derivative, for example, is a useful metric for detecting sudden jumps and separating them from gradual changes.

Another technology allows a CM to determine in real time the key according to which data to its algorithm's LMs will be sharded. As a consequence, the various LMs can have asymmetric roles in the calculation. Data-driven re-partitioning of the data allows separate LMs to train sub-models based on portions of the data that have distinct characteristics. Data-driven re-partitioning allows implementation of ensemble algorithms, e.g., bagging, boosting, cross-validation, or particle systems, without losing any of the benefits of the framework.

With another technology, the framework can be used to implement a many-to-many relation of LMs communicating with CMs. This allows a system to calculate not just one aggregate at any given time but multiple aggregates in parallel.

Particular embodiments of the subject matter described in this specification can be implemented so as to realize one or more of the following advantages. A system can combine the benefits of a stream processing system, e.g., fast continuous processing of an event stream in parallel, with the benefits of a compute intensive processing system, e.g., performing complex operations. The compute intensive processing system can be combined with other compute intensive processing systems to form a distributed processing system that can train complex machine learning models of underlying processes in an event stream, preferably in real time. Applying the models, the system can perform online scoring of the event stream, and continue to determine real time updates to the machine learning models.

In addition or alternatively, a system can reduce the latency for accessing context data for an event by partitioning the context data into operational memories of local modelers of the stream processing system. The system can further reduce latency by executing the stream processing operations in a same operating system process as a process maintaining the context data in operational memory. In this way the stream processing system can reduce latency of retrieving context data, e.g., by not requiring a call to an outside database. Additionally, the stream processing system can reduce latency due to data locking issues, and race conditions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes systems and methods that can be used to perform real-time analysis and modeling of large event streams of events.

An example system includes one or more computing systems operating as a stream processing system. The stream processing system includes multiple local modelers that perform operations of the stream processing system. The operations can be organized as operations associated with respective vertices of a stream processing graph, e.g., vertices in a directed acyclic graph (DAG). Operations associated with a vertex are operations logically organized, e.g., by a user, to be performed by a same local modeler. The event stream is partitioned, for each vertex, among multiple local modelers that perform the same set of operations, so that each local modeler receives a portion of the event stream. In this way the processing of the event stream can be performed in parallel, increasing throughput.

The local modelers aggregate information associated with the event stream, e.g., the local modelers aggregate information while processing received events. Aggregated information associated with the event stream can include aggregating a number of occurrences of particular information included in an event, aggregating respective results of a mathematical operation involving information included in each event, and so on. After aggregating information associated with multiple processed events, the local modelers provide the aggregated information to a central modeler.

The central modeler receives aggregated information and determines parameters of a respective machine learning model. The central modeler can provide model parameters of a machine learning model to one or more other central modelers. The parameters can also be provided to the local modelers, which then apply the machine learning model to the event stream. Additionally, the local modelers continue to aggregate information associated with the event stream to provide to a central modeler, which is used by the central modeler to determine and provide updates to the machine learning model.

Figure 1:
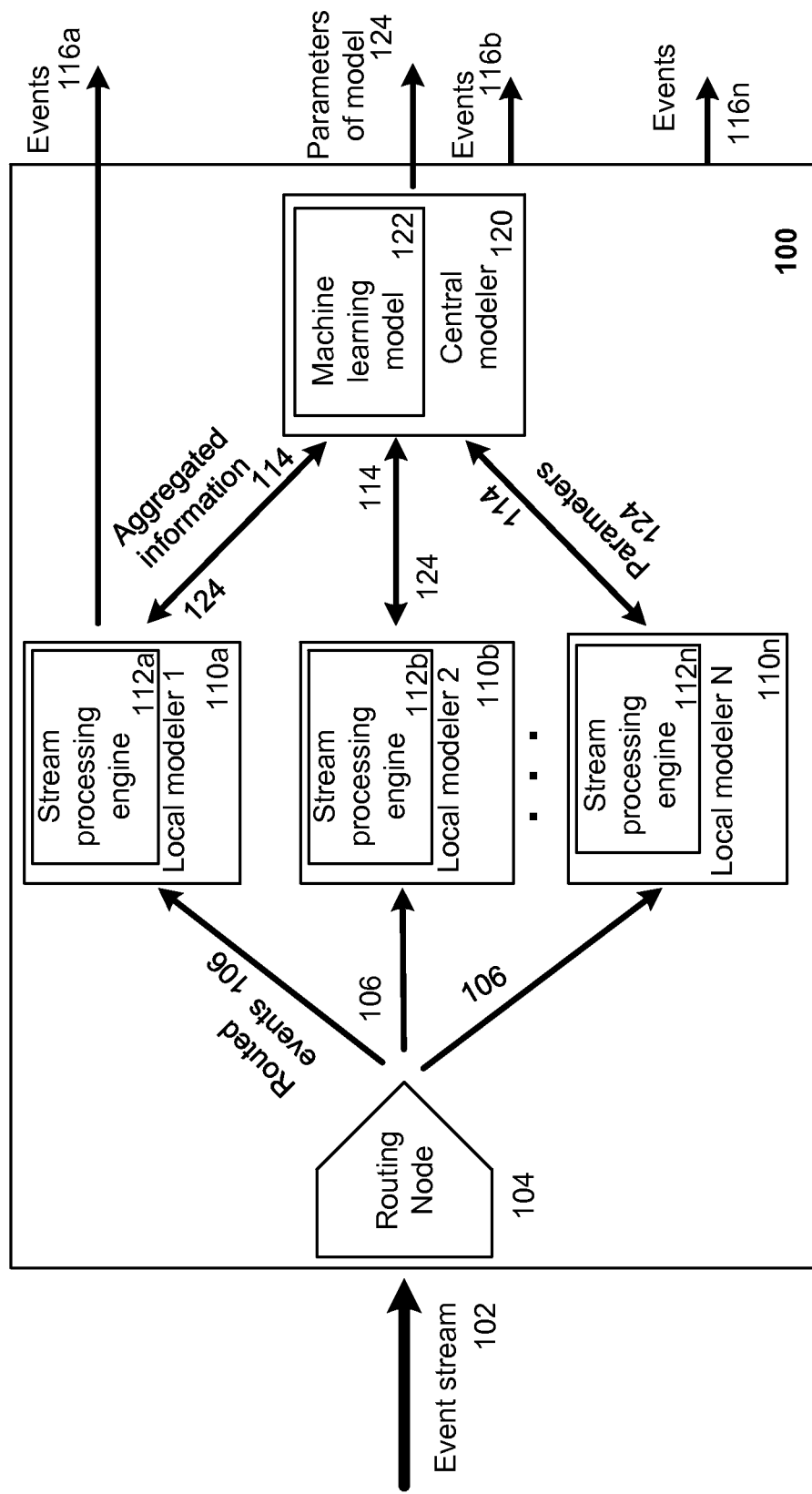
FIG. 1 is a diagram of an example system for processing an event stream.

FIG. 1 is a diagram of an example system 100 for processing an event stream 102. The system 100 includes multiple local modelers 110a-n and a central modeler 120 in communication with the local modelers 110a-n, e.g., over a network. Each of the modelers can be implemented as a system of one or more computer systems e.g., computing nodes, as software executing on one or more computer systems, or as respective virtual machines, executing on one or more computer systems. In some implementations each modeler can be a separate computing system in communication with other modelers.

The system 100 includes a router, e.g., routing node 104, which is in communication with the local modelers 110a-n. The routing node 104, e.g., an ingestion system, receives an event stream 102 of events, and routes each event to one of the local modelers 110a-n, e.g., over a network.

An event stream 102 is a sequence of events, e.g., a data tuple, with each event including information that can be identified as a key-value pair map. For instance, events can include information describing a time stamp of the event. The time stamp can be identified in the event as a key, e.g., "timestamp", "input.timestamp", mapped to a value, e.g., 1408741551. Events can include any arbitrary information, e.g., number of shirts sold by a store, telephone number of a placed call, and so on.

In some implementations the routing node 104 routes events by randomly or pseudo-randomly selecting among the local modelers 110a-n. In some implementations the routing node 104 can route events to local modelers 110a-n round-robin, e.g., the routing node 104 routes a first event to local modeler 110a, the immediate subsequent event to local modeler 110b, and so on. In some implementations the routing node 104 can route events to local modelers 110a-n according to information included in each event, e.g., information included in the data tuple. For instance, the routing node 104 can route events to local modelers 110a-n according to a routing key included in each event that identifies a local modeler.

Each local modeler, e.g., local modelers 110a, receives a portion of the event stream provided from the routing node 104, e.g., routed events 106. The local modelers 110a-n process routed events 106 using a stream processing engine 112a-n, e.g., a software application that defines operations of a stream processing system. The stream processing engine 112a-n processes events according to a first set of operations of the stream processing system.

The local modelers 110a-n typically include the same stream processing engine 112a-n, so that each local modeler 110a-n performs the same first set of operations. Thus, the local modelers 110a-n process respective routed events 106 in parallel.

The local modelers 110a-n can store parameters of a machine learning model. The parameters can be provided to the local modelers by a central modeler 120, described below. The local modelers 110a-n can process each routed event 106 to perform scoring of the event stream using the machine learning model. Scoring refers to characterizing events. In some implementations scoring refers to applying a received machine learning model, e.g., applying a set of rules determined from the machine learning model. For instance, each local modeler 110a-n can assign a label to each event during processing, and include the label in the event. That is, events can be processed to best determine, using a machine learning model, a proper label, e.g., a classification, for the event. In some implementations, the local modelers can receive references, e.g., identifiers, of executable segments, e.g., code segments, and can execute the segments to perform scoring.

The local modelers 110a-n can aggregate information 114 associated with routed events 106. For instance, the local modelers can store data identifying a number of occurrences of a particular piece of information included in the routed events 106. Additionally, the local modelers can store data identifying a number of occurrences of information associated with each routed event 106, but not included in the routed event 106 itself. For example, an event can include information identifying a telephone number, and the local modelers 110a-n can obtain, e.g., from a database, a classification of a business associated with the telephone number. The local modelers 110a-n can aggregate information 114 identifying a number of occurrences of respective business classifications. The local modelers 110a-n provide this aggregated information 114 to the central modeler 120.

The central modeler 120 can communicate with the local modelers 110a-n, and can, in some implementations, execute on a different computer system than the local modelers 110a-n. Each local modeler 110a-n stores a reference to the central modeler 120, e.g., an identifier of the central modeler 120, e.g., a network address. Similarly, the central modeler 120 stores a reference to each local modeler 110a-n. In some implementations, each local modeler registers with the central modeler 120, and the central modeler 120 stores information identifying the registered local modeler. Registering with a central modeler is described below, with reference to FIG. 4.

The central modeler can request aggregated information 114 asynchronously from the local modelers 110a-n, e.g., in some implementations the central modeler can provide a request to each local modeler and not wait for a response from the local modelers 110a-n. The central modeler can obtain information from a configuration file identifying conditions that when satisfied, cause the central modeler 120 to request aggregated information 114. For instance, the configuration file can identify a threshold amount of time, e.g., 50 milliseconds, 100 milliseconds, 1 second, for the central modeler to wait before providing requests to each local modeler 110a-n for aggregated information. In some implementations each local modeler can store the threshold amount of time and automatically provide the aggregated information to the central modeler 120. Configuration files are described below, with reference to FIG. 4.

Alternatively or in addition, a local modeler can determine that it has processed a defined threshold number of routed events 106, e.g., 100, 300, or 6000, and provide the aggregated information 114 to the central modeler 120, e.g., as a push to the central modeler 120. The threshold number can be defined in a configuration file read by the local modelers 110*a-n*, described below with reference to FIG. 4. In some implementations, a local modeler can determine that it has processed a threshold amount of data, e.g., the aggregated information has surpassed a threshold amount of information, e.g., as measured in bytes.

The local modelers 110*a-n* continuously receive routed events 106 and process them. After processing, the local modelers 110*a-n* can provide the processed events 116*a-n* to local modelers that perform a second set of operations of the stream processing system.

The central modeler 120 stores a machine learning model 122, e.g., a Predictive Model Markup Language (PMML) file that identifies the machine learning model 122. Upon receipt of the aggregated information 114 from the local modelers 110*a-n*, the central modeler can determine parameters, e.g., updated parameters, to the machine learning model 122. The central modeler 120 can determine when to determine parameters, e.g., updated parameters, based on how many of the local modelers 110*a-n* have provided aggregated information to the central modeler 120. For example, the central modeler 120 can determine updated parameters when at least a threshold percentage, e.g., 50%, 60%, or a user definable percentage, of the local modelers 110*a-n* have provided aggregated information. In some implementations, the central modeler 120 can determine parameters of a Gaussian mixture model using aggregated information that specifies the number of mixture components, the number of processed events, the means of respective components, and so on.

The central modeler 120 can determine whether to provide the parameters 124 to the local modelers 110*a-n*. If the central modeler 120 has never provided parameters to the local modelers 110*a-n*, then the central modeler 120 can provide parameters for storage. Furthermore, if the central modeler 120 has previously provided parameters, the central modeler 120 can determine whether the parameters are different from the previously provided parameters, e.g., different at greater than a threshold percentage. Upon a positive determination the central modeler 120 provides the parameters 124 to the local modelers 110*a-n*. The local modelers 110*a-n* use the parameters 124 to perform scoring of the routed events 106, described above.

Additionally, the central modeler 120 can provide the parameters 124 to a subset of the local modelers 110*a-n*. That is, the central modeler 120 can obtain information, e.g., from a configuration file, that identifies local modelers 110*a-n* to receive the parameters 124.

The central modeler 120 can provide the determined parameters 124 to a different central modeler, e.g., a central modeler in communication with local modelers that perform a second set of operations. The parameters can be used by the different central modeler to determine a distinct machine learning model, or a different step of an overall machine learning model. The central modeler 120 can determine to provide the parameters 124, e.g., every time the central modeler 120 has provided parameters to local modelers 110*a-n*, by determining that the central modeler 120 has not provided updated parameters 124 since a threshold amount of time, or by determining that the parameters 124 are sufficiently different from the most recently provided parameters, e.g., at greater than a threshold percentage. For instance, the parameters 124 can be represented as a vector of parameters, and the most recently provided parameters can be represented as a different vector of parameters. The system can compute the norm, e.g., the L1-norm or L2-norm, of the vector of parameters and the different vector of parameters, and identify whether the result exceeds a threshold value.

The central modeler 120 and the different central modeler communicate asynchronously. That is, each central modeler can push updates of parameters to a different central modeler, or receive updates of parameters, e.g., by providing a request for updated parameters, or by receiving the parameters as a push from the different central modeler. Additionally each central modeler 120 can communicate with multiple other central modelers.

The central modeler 120 can pull parameters from a different central modeler, e.g., by providing a request to the different central modeler. The request can include an identifier for the different central modeler, or the request can include an identifier of a particular machine learning model stored by the different central modeler. The central modeler 120 can access data representing mappings between identifiers of machine learning models and identifiers of central modelers, and obtain a desired identifier of a central modeler.

In some implementations, the local modelers 110*a* can be in communication with more than one central modeler, e.g., a second central modeler and the central modeler 120. The local modelers 110*a* can aggregate information, described above, for each central modeler. For instance, the local modelers 110*a* can aggregate a first type of information associated with the event stream 102 for central modeler 120, and a second type of information associated with the event stream 102 for a different central modeler. The central modelers can receive the respective aggregated information, and determine parameters of a respective machine learning model. The local modelers 110*a-n* can receive the different parameters, and perform scoring using the two machine learning models.

As described above, and below, the local modelers 110*a-n* and central modeler 120 can store information, e.g., parameters of a machine learning model, aggregated information, machine code, instructions, and any arbitrary information. All of this information can be replicated across storage systems and provided to each modeler in a fast efficient manner.

Figure 2:
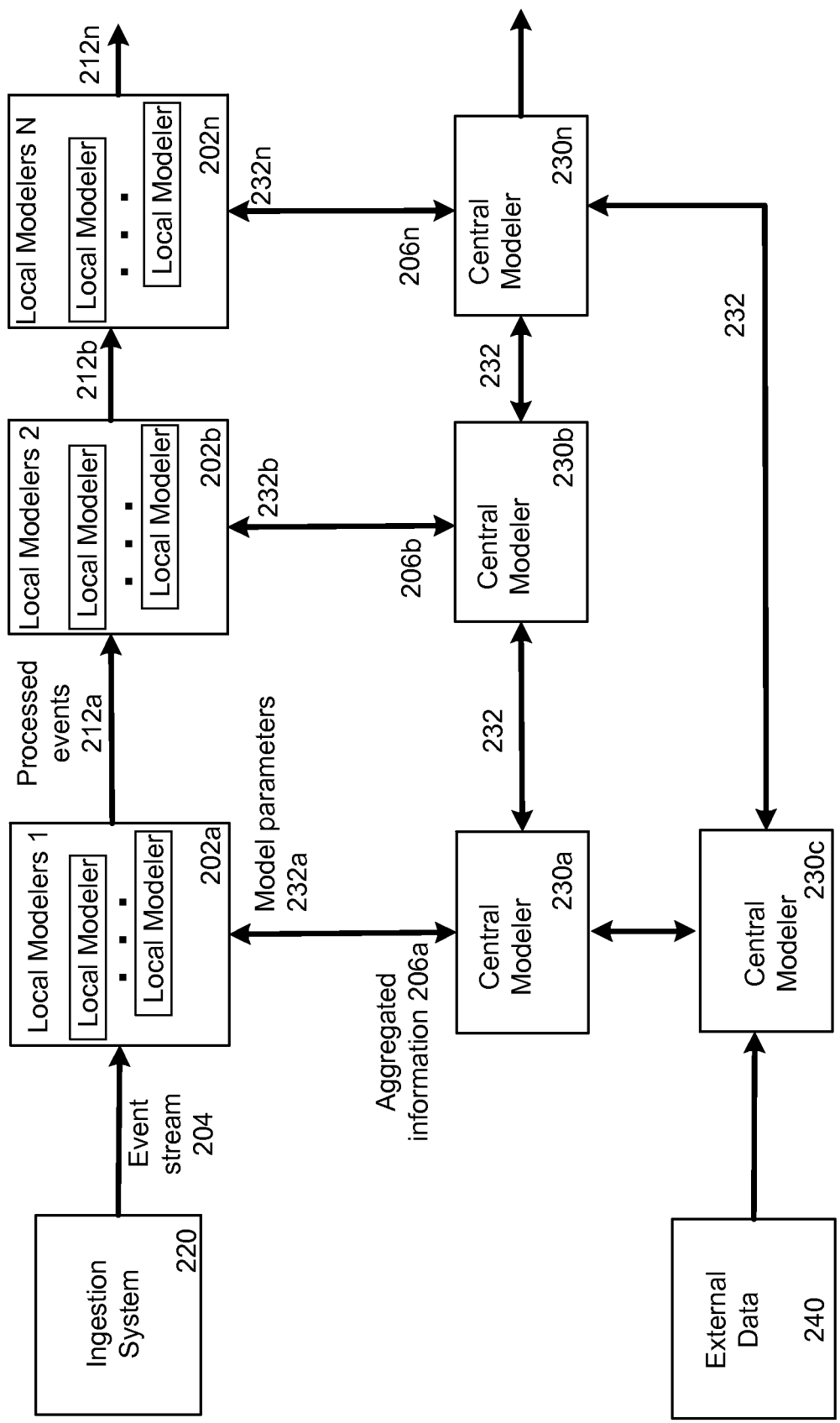
FIG. 2 illustrates a first example of processing an event stream.

FIG. 2 illustrates a first example of processing an event stream 204 of events. The example of FIG. 2 includes a first group of local modelers 202*a* of a stream processing system in communication with a central modeler 230*a*, a second group of local modelers 202*b* of the stream processing system in communication with a central modeler 230*b*, and an n-th group of local modelers 202*n* of the stream processing system in communication with a central modeler 230*n*.

An event stream 204 is received at an ingestion system 220, which may be, for example a routing node like the routing node 104 (FIG. 1), and routed to the first group of local modelers 202*a*. As described above, each local modeler of the local modelers 202*a* receives a portion of the event stream 204 for processing. The local modelers 202*a* perform a first set of operations of the stream processing system.

Since the local modelers 202a operate as a stream processing system, the local modelers 202a process received events at all times, e.g., synchronously receiving events, processing events, and providing the processed events to other local modelers, e.g., local modelers in the second group of local modelers 202b. If the local modelers 202a, have stored parameters of a machine learning model, they can process the event stream to perform scoring using the machine learning model, and also aggregate information in parallel. If the local modelers 202a have not yet received parameters of a machine learning model, they can aggregate information. This aggregated information 206a can be provided to the first central modeler 230a, which is in communication with the local modelers 202a.

The aggregated information 206a can be provided to the central modeler 230a from a local modeler of the local modelers 202a after the local modeler has processed a threshold number of events, or after a threshold number of local modelers 202a have processed the threshold number of events. Additionally, the aggregated information 206a can be provided after a threshold amount of time has passed since the local modelers 202a last provided aggregated information 206a to the central modeler 230a.

After processing an event of the event stream 204, the local modelers 202a provide the processed event 212 to local modelers of the second group of local modelers 202b, e.g., local modelers that perform a second set of operations of the stream processing system. In some implementations the processed event 212 is provided to a routing node, which routing node routes events to particular local modelers in the second group 202b. Similarly, after a local modeler of the second group 202b processes an event 212a, the local modeler provides the processed event 212b to local modelers of the n-th group of local modelers 202n. In any particular case, the processed events may or may not be modified, i.e., they may or may not be different from the received events.

Each central modeler can determine parameters 232 of a respective machine learning model using received aggregated information. In some implementations the central modelers 230a-n can each determine parameters of a different machine learning model. In some other implementations each central modeler determines a portion of an overall machine learning model. Each central modeler then can determine to provide the parameters to local modelers in communication with the central modeler, and to other central modelers. How central modelers can provide parameters of a machine learning model is described below, with reference to FIG. 5.

Additionally, the central modelers can receive aggregated information from respective local modelers asynchronously, and independently of each other central modeler. That is, a central modeler 230b can receive aggregated information 206b without regard to a different central modeler 230n.

External data 240 can be obtained, e.g., from a database, by a central modeler 230c for use by the central modeler 230c. Central modeler 230c can also receive parameters of a respective machine learning model from another central modeler, e.g., central modeler 230a, and use the external data 240 and/or the parameters to perform a compute intensive computation. For example, central modeler 230a can determine parameters of a machine learning model, and provide the parameters to central modeler 230c. Central modeler 230c can then obtain external data 240 and map the external data 240 to the machine learning model determined by central modeler 230a. After mapping the external data 240, the central modeler can provide the parameters of the machine learning model and the determined mappings to a different central modeler, e.g., central modeler 230n. In another example, the central modeler 230a can determine parameters of a machine learning model, and provide the parameters to the central modeler 230c. Central modeler 230c can then obtain external data 240, and determine parameters of a respective machine learning model using the parameters received from central modeler 230a and the external data 240. Additionally, the central modeler 230c can determine updated parameters of the received parameters from central modeler 230a using the external data 240, and provide the updated parameters to another central modeler, e.g., back to central modeler 230a or central modeler 230n.

Note that all, none, or some of the central modelers in a particular implementation may obtain external data, and that different central modelers may obtain different external data.

Note that central modelers can speak with each other in a circular fashion and that the size of the loop can be any size. In particular, a loop can be of size 2: in particular implementation, a central modeler A can update a central modeler B, which can then later update the central modeler A, and so on. The topology shown in FIG. 2 is merely illustrative.

Figure 3:
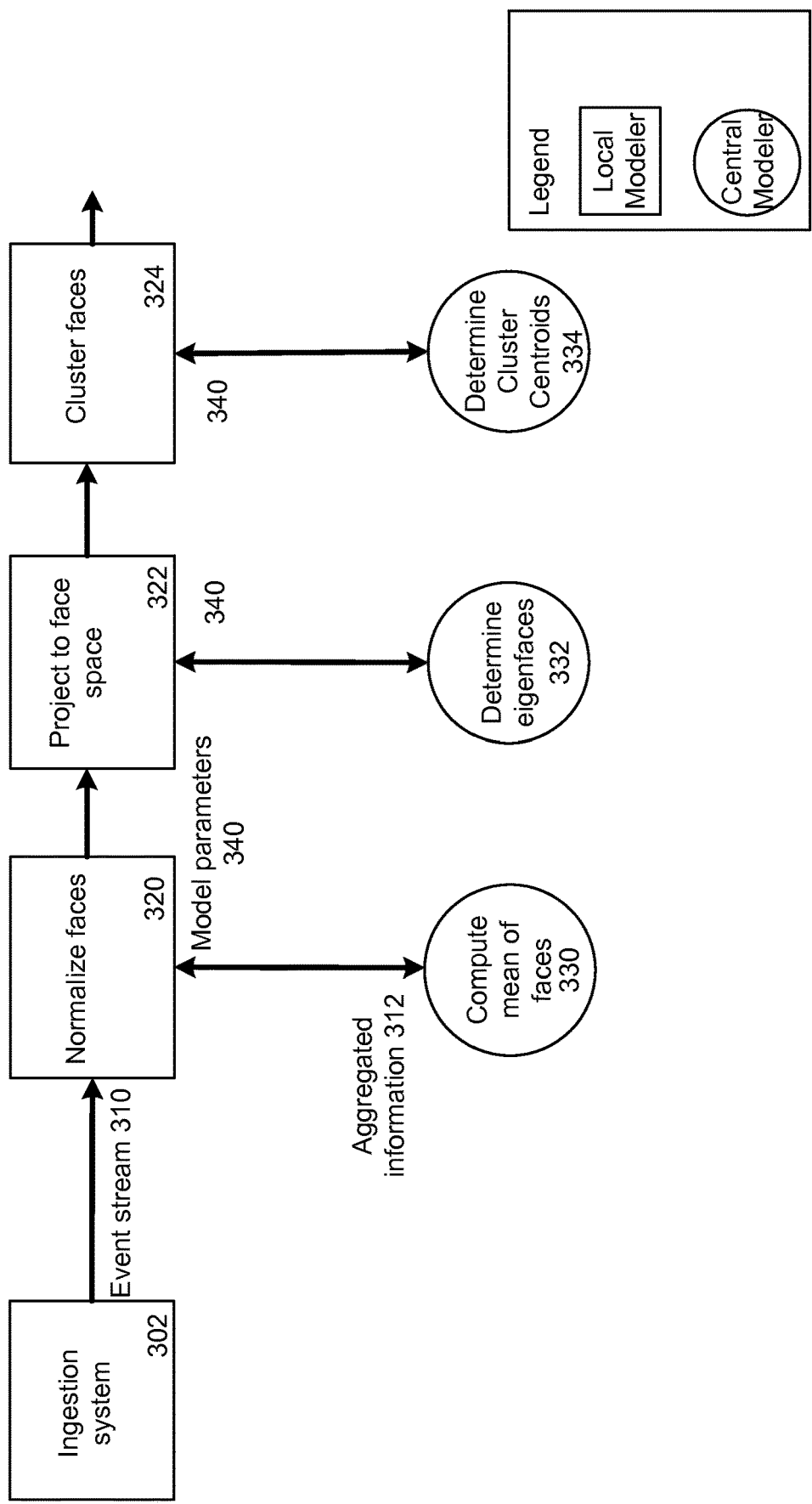
FIG. 3 illustrates a second example of processing an event stream to perform facial recognition.

FIG. 3 illustrates a second example of processing an event stream. The example of FIG. 3 can be used to assign labels to respective individuals seen in images, e.g., obtained from one or more video cameras. The illustration includes local modelers, e.g., local modelers 320, local modelers 322, and local modelers 324, and central modelers, e.g., central modelers 330, 332, and 334.

An event stream 310 of events is provided to local modelers 320. Each event of the event stream codifies a facial image of a single person, with the events in the event stream 310 encoding images of many distinct individuals, e.g., unknown people captured in video camera data.

The local modelers 320 aggregate information associated with the event stream, e.g., sum the events together. Periodically, the local modelers 320 provide the aggregated information 312 to a central modeler 330. The central modeler computes an average of the events processed by the local modelers 320, and obtains an average face vector. That is, the central modeler 330 determines an average face from all of the faces seen by the local modelers 320. The central modeler 330 then provides parameters that define the average face, e.g., a vector of average pixel values, to each of the local modelers 320 for storage.

After determining the parameters, the local modelers 320 use the parameters to determine a difference vector between a particular face included in an event and the average face determined by the central modeler 330. After processing an event of the event stream 310, the event is provided to local modelers 322.

Local modelers 322 receive each event and aggregate information associated with the event. For instance, the local modelers 322 receive the difference between a particular person's face in each event and the average face, and aggregate the differences to generate a covariance matrix. Periodically, the local modelers 322 provide the aggregated information, e.g., respective covariance matrices, to central modeler 332.

Central modeler 332 receives the aggregated information, e.g., the covariance matrices, from local modelers 322 and computes a covariance matrix over the entire event stream 310. The central modeler 332 then proceeds to perform eigenvector analysis over this covariance matrix in order to compute eigenfaces in the data. Each eigenface is a vector in the determined space of faces. These eigenfaces therefore define a linear transformation from pixel-value-space to a space of faces. Potentially, central modeler 332 may discard eigenfaces whose eigenvalues are lower than a predefined threshold or only keep a predetermined number of eigenfaces whose eigenvalues are maximal.

The central modeler 332 provides parameters identifying the linear transformation into the space of faces to the local modelers 322 for storage. Each local modeler receives the event stream 310 and projects each event onto the space of faces, e.g., the local modeler computes a weight vector identifying weights of the event's eigenface components. After processing an event, the local modelers 322 provide the processed event to local modelers 324.

Local modelers 324 receive each processed event that includes information describing a projection onto the space of faces. The local modelers 324 then aggregate information associated with the event stream 310, e.g., by approximating the distribution of data in the space of faces by means of a Gaussian mixture model.

Periodically, the local modelers 324 provide the approximated distribution parameters to central modeler 334, which further aggregates the information in order to compute an approximated distribution of the data from the entire event stream 310. The central modeler 334 uses this approximate distribution in order to characterize the positions of clusters in the data, described, e.g., by the cluster centroids and their radii. Central modeler 334 then provides the cluster parameters to the local modelers 324 for storage.

Local modelers 324 utilize the cluster parameter data in order to map the face-space vector associated with each incoming event into one of the clusters. The identity of the cluster forms the label which local modelers 324 include in the event, e.g., to designate a label for the face identified by the event. The labeled event is then forwarded for further processing downstream.

Figure 4:
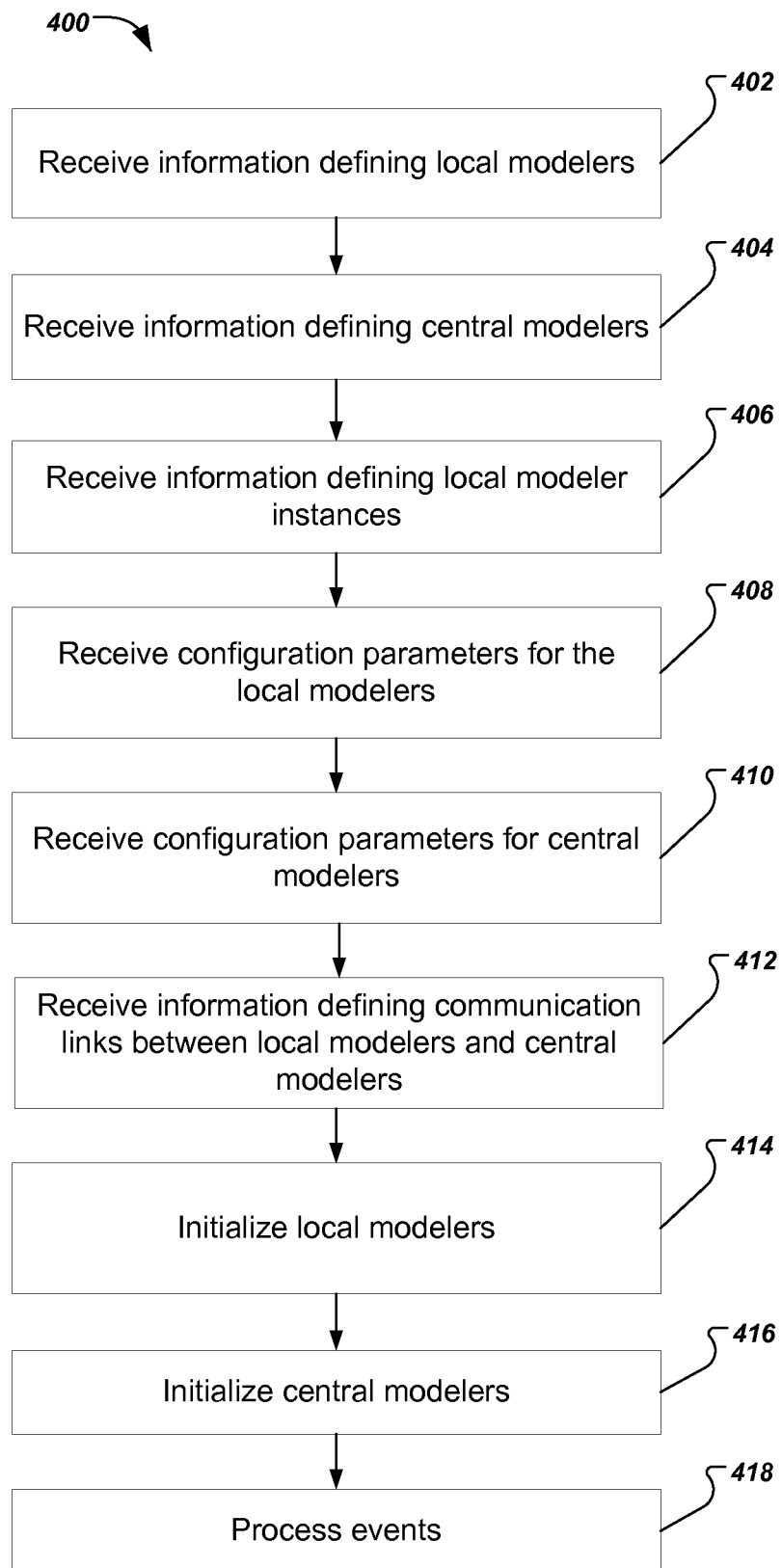
FIG. 4 is a flow chart of an example process for defining operations performed by the system.

FIG. 4 is a flow chart of an example process 400 for defining a workflow and processing events. In general, a system provides, to a developer, a framework for identifying operations to be performed by the system. The developer can utilize the framework to define sets of operations of a stream processing system, e.g., local modelers 110a-n. Additionally, the developer can define operations to be performed by one or more central modelers, e.g., central modeler 120, in communication with local modelers. After defining operations, a developer can define communication links between local modelers, and central modelers, to define an overall workflow, e.g., illustrated in FIG. 3. The workflow can be implemented by the system using the development framework, e.g., functions in a library, e.g., functions written in the JAVA™, C, or C++ programming languages, that define local modelers and central modelers. In general, the developer of the workflow does not have to have knowledge about how the system is implementing the workflow. The process 400 will be described as being performed by an appropriately programmed system of one or more computers, e.g., the system 100 illustrated in FIG. 1.

The system receives information defining local modelers (402). A developer can define sets of operations to be performed by local modelers. For instance, the developer can utilize a development framework that defines functions of a local modeler, e.g., JAVA functions in a library. A developer can define templates of local modelers that perform various operations, e.g., aggregating particular information in an event stream, scoring an event stream using a machine learning model. The developer can also program how the local modelers communicate, e.g., using the functions in a library.

The system receives information defining central modelers (404). The developer can define different central modelers that can be used to effect different machine learning models. The developer can define a machine learning model with operations that perform a process to generate a machine learning model. Additionally, the developer can include operations to read in, or store, parameters of a machine learning model in a file or data structure, e.g., a Predictive Model Markup Language (PMML) file, e.g., a file that defines a mapping of input data to data used in the machine learning model, a mapping of output data, and the architecture of the machine learning model. The developer can also define arbitrary operations that a central modeler can perform beyond implementing a specific machine learning model. For instance, a central modeler can store previous machine learning models, generate alerts, obtain external data, e.g., from a database, and so on.

The system receives information defining local modeler instances (step 406). After defining templates of local modelers and central modelers, the developer can define local modelers that implement a stream processing system. That is, the developer can identify, from the local modelers described in reference to step 402, particular local modelers. The developer can utilize a configuration file, e.g., an Extensible Markup Language (XML) file, to identify the local modelers.

The system receives configuration parameters for the local modelers (step 408). The developer can define configuration parameters, e.g., parameters that specify how information in each event is utilized by local modelers, when local modelers push aggregated information, and so on, for the local modelers.

The developer can utilize the configuration file to specify a mapping of information from an event stream to the local modelers, e.g., to each local modeler independently, or to all local modelers. For instance, each event of the event stream can have three key-value pairs, described above, and the developer can identify a mapping from each key-value pair to variables used in operations of the local modeler.

The developer can specify policies for when the local modelers are to provide aggregated information to a central modeler. For instance, the developer can specify that the local modelers need to process a threshold number of events before providing aggregated information, e.g., as a push, to a central modeler. The developer can also specify that the local modelers need to have processed, or generated, a threshold amount of information before providing aggregated information to a central modeler.

The developer can specify that local modelers should perform different operations depending on whether they have received parameters from a central modeler, e.g., the developer can specify aggregation of information in any event and scoring of the event stream if parameters have been received.

The system receives configuration parameters for central modelers (step 410). The developer can identify one or more central modelers in the configuration file. The developer can also specify, e.g., in the configuration file, that a machine learning model is to be obtained by a central modeler, and include a location of the machine learning model, e.g., a PMML file, in the configuration file.

Additionally, the developer can specify that two or more central modelers will be providing machine learning model parameters between each other frequently. The system can determine from this that the two central modelers should execute on a same computer system, processing node, or in a same operating system process, e.g., same JAVA virtual machine.

The developer can identify policies that define one or more configuration parameters of a central modeler. For instance, the developer can include a policy that defines an amount of time a central modeler waits until requesting aggregated information from local modelers. Alternatively, a policy can define a threshold amount of events that a local modeler has to process before providing aggregated information to a central modeler. A policy can specify that any time a central modeler determines updates to a machine learning model, it is to provide the updated parameters to local modelers it is in communication with. Similarly, a policy can specify when a central modeler is to push an updated machine learning model to another central modeler, e.g., when the updated parameters are different from prior parameters at greater than a threshold percentage. Furthermore, the developer can specify that a central modeler only determines updates to a machine learning model upon determining that a threshold number of local modelers have provided aggregated information. Similarly, a policy can specify that a central modeler only determines updates upon determining that a threshold number of local modelers have processed a threshold number of events, e.g., the central modeler can receive aggregated information and identify from a size of the aggregated information a number of events that have been processed.

The system receives information defining communication links between local modelers and central modelers (step 412).

In some implementations the developer can utilize a configuration file, e.g., an Extensible Markup Language (XML) file, to identify communication links between local modelers and central modelers, e.g., how events should flow between them. Each local modeler is identified in the configuration file by an identifier, e.g., a name, or identification number. Along with an identifier of each local modeler, the configuration file includes identifiers of central modelers that are in communication with each local modeler. In some implementations the developer can identify a number of local modelers that should perform operations identified by a local modeler identified in step 408, e.g., multiple local modelers can execute in parallel to increase throughput.

In some implementations the system can provide a user interface configured to receive input from a developer identifying communication links, e.g., a stream processing graph. For instance, the interface can allow for a developer to identify stream processing vertices connected by directed edges, with each directed edge passing an event stream to a vertex. The vertices can be graphically represented, e.g., as boxes or nodes in the user interface, and the developer can assign names or identifiers to each vertex. Each vertex can be associated with a set of operations, and upon selection of a vertex, the system can identify a local modeler that performs the set of operations.

The system initializes the local modelers (step 414). After defining a workflow, e.g., with the communication links described above in step 412, the system initializes the local modelers according to the configuration file. The system obtains and executes development code that implements the local modelers identified in the configuration file. That is, the system initializes one or more local modelers according to the configuration file, e.g., identifies a central modeler in communication with the local modeler, mapping of input data to internal variables, and so on. The system can execute functions of a library that define functions of local modelers, e.g., initialization functions.

The system initializes the central modelers (step 416). The system initializes the central modelers according to the configuration file. The system initializes each central modeler, e.g., registers each local modeler in communication with the central modeler, obtains machine learning models identified in the configuration file, and so on. If identified in the configuration file, a central modeler can provide the machine learning model to local modelers in communication with the central modeler. The system implements the initialization by executing functions of a library that define functions of central modelers, e.g., initialization functions. Similarly, the system implements providing a machine learning model to local modelers by executing a central modeler function to provide the machine learning model, and executing a local modeler function to receive and store the machine learning model.

The system processes events according to the workflow (step 418). Processing events is described below, with reference to FIG. 5

Figure 5:
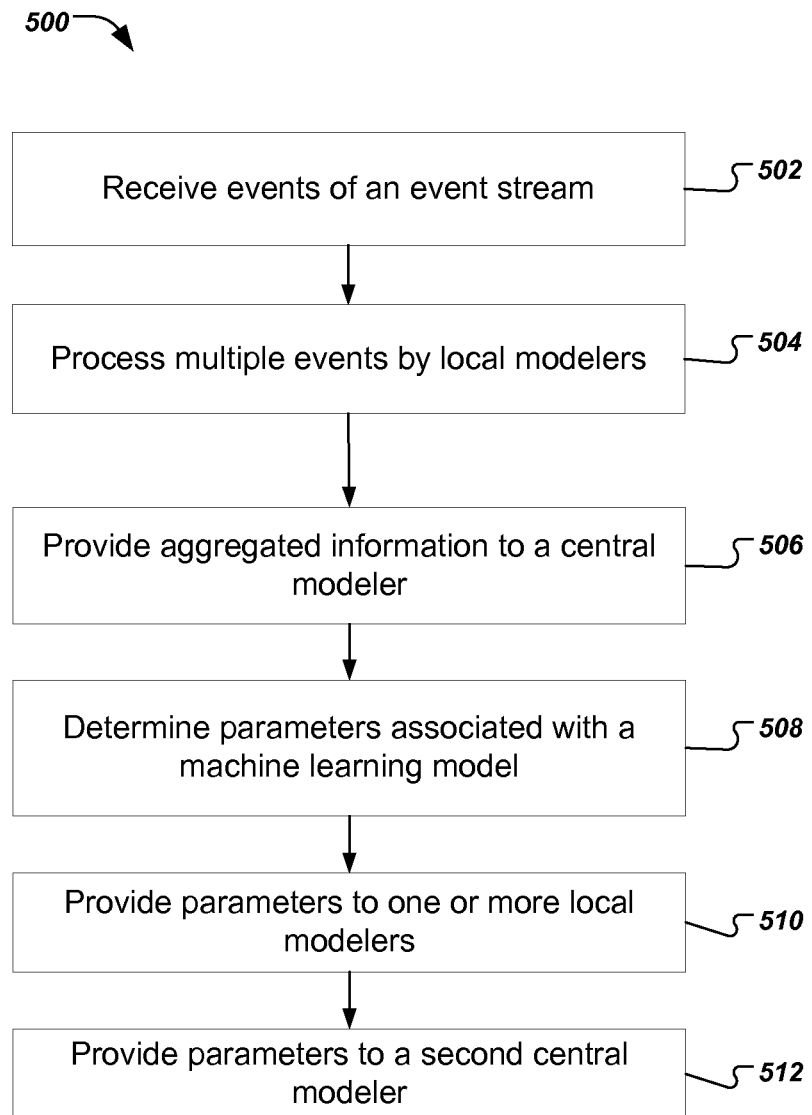
FIG. 5 is a flow chart of an example process for processing an event stream.

FIG. 5 is a flow chart of an example process 500 for processing an event stream. The process 500 will be described as being performed by an appropriately programmed system of one or more computers, e.g., the system 100 illustrated in FIG. 1.

The system receives an event stream (step 502). The system can receive the event stream over a network, e.g., the Internet, from a user device. Events are identifiable occurrences, e.g., a telephone call being placed, a patron buying coffee at a business, a measured wind speed at a particular wind turbine. Each event has included information, e.g., a telephone number, a type of coffee, the price of the coffee, waiting time of the patron buying coffee.

The system receives the event stream and routes each event to a particular local modeler of a multitude of local modelers of a stream processing system. In some implementations, each event is routed according to where context data of the event is likely to be maintained.

The system processes events according to a first set of operations of the stream processing system (step 504). Each event is routed to a particular local modeler, and the system processes each event by performing a first set of operations, with each local modeler performing the same operations in parallel on received events.

The operations can include operations to perform scoring of the received event stream. Scoring can refer to characterizing events by applying a machine learning model to information included in events. In some implementations scoring can include determining information to append to information included in each event, e.g., labels that characterize or classify the event, or a particular coordinate address, e.g., in a space of faces as described in reference to FIG. 3. Additionally, scoring can include modifying information included in each event. The machine learning model can have previously been determined by the system and provided to the local modelers, described below with reference to steps 508 and 510. Alternatively the machine learning model can have been provided by a central modeler, e.g., the central modeler can obtain the machine learning model from a location specified in a configuration file.

Furthermore, the system can aggregate information associated with each event. For example, the local modelers can aggregate occurrences of particular information included in each event, e.g., a particular piece of information included in a data tuple that defines the event.

After performing operations on a respective event, the system provides the processed event to local modelers that perform a subsequent set of operations of the stream processing system. The processed events may include information, e.g., labels, data values, inserted by the local modelers, e.g., to perform scoring of the events.

The system provides aggregated information to a central modeler (step 506). The system can provide the aggregated information from one or more local modelers to a central modeler. The central modeler can provide a request to each local modeler for aggregated information. The local modelers then receive the request, and provide the aggregated information asynchronously to the central modeler. In some implementations the central modeler can provide the request after waiting a threshold amount of time, e.g., 50 ms, 100 ms, 1 second. The threshold amount of time can be defined in a configuration file, described above with reference to FIG. 4.

Furthermore the central modeler can receive aggregated information from a local modeler after the local modeler has processed a threshold number of events, e.g., 500, 1000, 10000 events. The central modeler can also receive aggregated information from only local modelers that have processed the threshold number of events. Additionally, the central modeler can receive aggregated information from every local modeler after a threshold percentage, e.g., 50%, 60%, 92%, have processed the threshold number of events. The system determines parameters associated with a machine learning model (step 508). The central modeler receives the aggregated information, and determines parameters of a machine learning model. The central modeler determines parameters to a parametric machine learning model, e.g., linear discriminant analysis, k-means clustering, Bayesian mixture models, specified by a developer, e.g., in a configuration file.

In some implementations the system provides parameters to each local modeler for storage, described in reference to step 510, and provides parameters to a second central modeler, described in reference to step 512. The system can obtain information, e.g., from a configuration file, that defines circumstances under which the central modeler is to provide parameters to local modelers, or to a second central modeler.

The system provides the parameters to one or more local modelers (step 510). The central modeler can provide the parameters in an asynchronous call to the local modelers. The local modelers receive the parameters store them, and perform scoring of the event stream using the machine learning model. The local modelers can then provide the scored event stream to subsequent local modelers, e.g., local modelers that perform subsequent operations of the stream processing system. Additionally the local modelers aggregate information associated with the event stream in parallel with performing scoring.

After receiving parameters, the local modelers can overwrite any existing parameters of the machine learning model with the new parameters received from the central modeler. Alternatively, the local modelers can store the existing parameters and also the new parameters received from the central modeler. In this way the local modeler can perform scoring using both machine learning models.

The system provides the parameters to a second central modeler (step 512). Upon determining parameters, the system can automatically provide the parameters to a second central modeler, e.g., provide the parameters asynchronously. In some implementations, if the system has only determined parameters one time, the system will automatically provide the parameters to the second central modeler.

If the system has provided parameters to the second central modeler a previous time, the system determines whether to provide the parameters. In some implementations the system determines that the determined parameters are different from the previously provided parameters at greater or less than a threshold percentage, e.g., 0.5%, 1%, or 2%.

In some implementations the system can perform step 510, and provide scored events to subsequent local modelers, without providing parameters to a second central modeler. Similarly, the system can provide parameters to the second central modeler without providing scored events to subsequent local modelers.

Figure 6:
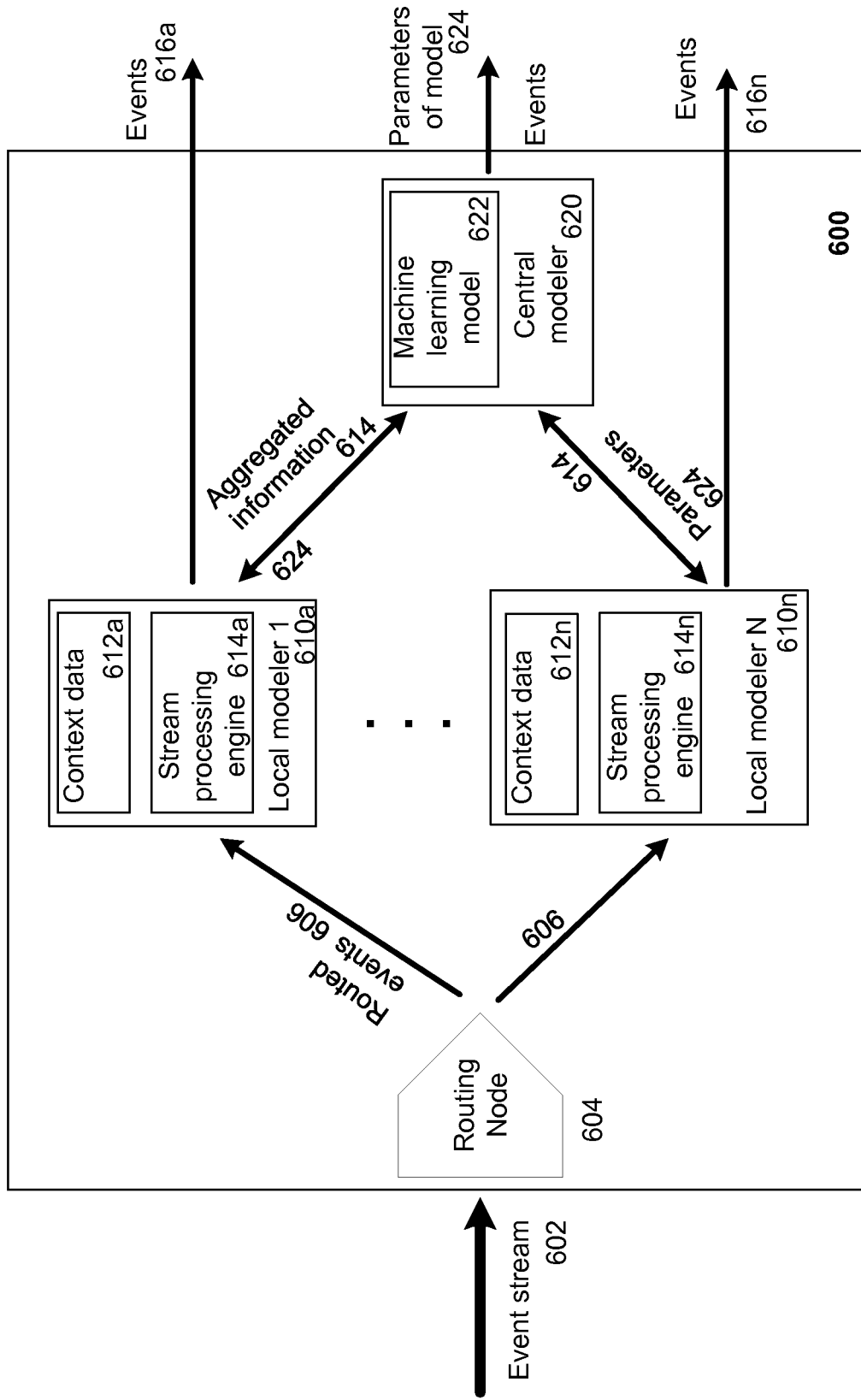
FIG. 6 illustrates an example system for processing an event stream by a first example routing strategy using context data.

FIG. 6 illustrates an example system 600 for processing an event stream by an example routing strategy using context data. The system 600 includes multiple local modelers 610a-n of a stream processing system in communication with a central modeler 620, which are described above with reference to FIG. 1. The system 600 also includes a routing node 604, that receives an event stream 602 and routes each event in the event stream according to the routing strategy, e.g., to a particular local modeler that stores context data related to the processing of the event. Context data is pre-existing data related to an event that does not occur within data attributes of the event itself. For example, an event that represents a phone call being initiated may include a data attribute that includes a user's phone number. However, the event would typically not include other information about the user, e.g., a user's home address.

The local modelers 610a-n each include operational memory, e.g., high-speed memory designed for fast random access by a processor, e.g., dynamic random access memory. Each of the local modelers 610a-n maintains a partition of context data, with each partition of context data maintained in operational memory by the respective local modeler. In some implementations the partition of context data 612a-n is maintained by a same operating system process executing operations of the stream processing engine 614a-n, e.g., in the same process of a JAVA virtual machine. For example, the operating system process can obtain context data for a particular event and then process the event using the context data within the same operating system process.

The context data is generally partitioned across the local modelers 610a-n, with each local modeler receiving a particular partition of the context data 612a-n. However, some context data can be stored by each local modeler if the context data is sufficiently small. The system 600 can partition context data so that particular context data related to a particular event is likely to be located on a same local modeler as other context data related to the particular event, e.g., context data needed for processing the event.

When the routing node 604 receives an event included in an event stream 602, the routing node 604 routes the event according to data affinity with the partitions of context data 612a-n. Routing by data affinity refers to distributing an event to a local modeler that is likely to maintain context data related to the event. In some implementations the routing node 604 can route each received event by obtaining information included in each event, and determining a partition of context data that stores context data related to the obtained information. The routing node 604 can identify the information to obtain in each event from a configuration file identifying a particular key-value pair, e.g., a developer can define that events are to be routed by phone number.

For instance, the routing node 604 can obtain a routing key included in an event, and determine a partition of context data that stores context data related to the particular routing key. In some implementations the routing node 604 can perform a hashing process on the routing key, and obtain an identifier of a partition of context data. In some implementations, the routing node 604 can store information identifying mappings between ranges of routing keys and respective partitions of context data that store context data related to routing keys included in a range.

Additionally, the routing node 604 can store information identifying mappings of partitions of context data and local modelers storing the respective partition.

The routing node 604 can then provide the event to the local modeler that stores the partition of context data.

In some implementations, an event can include a data affinity hint. A data affinity hint identifies a partition of context data that is likely to have context data for the event. In some implementations a data affinity hint can be metadata included in an event that identifies a partition of context data. The data affinity hint can also be information appended to a data tuple defining an event, or can be information included in a message header used to route the event to a particular local modeler.

After receiving routed events 606, each local modeler processes each event according to a first set of operations of the stream processing system, as described above with reference to FIG. 1. After processing an event, a local modeler 610a provides the event 616a to a different routing node. The different routing node routes events to local modelers that process events according to a second set of operations of the stream processing system.

In processing the event stream, the local modelers 610a-n score the event stream, e.g., modify each event to include or modify information. The different routing node can use the information modified by the local modelers 610a-n to route each event. For instance, local modelers 610a-n can classify, e.g., label, each event based on a stored machine learning model. The different routing node can route each event based on the classification.

In some implementations the local modeler 610a can modify the data affinity hint in the event 616a. The modified data affinity hint informs the different routing node how to route the event 616a using context data.

In some other implementations the different routing node can receive the event 616a and determine a partition of context data based on information included in the event 616a, e.g., a developer can define a key-value pair in each event to route events by. The information included in the event, e.g., the key-value pair, can be different than information that the routing node 604 uses. That is, for example, a developer can identify that events should be routed according to phone number, and then routed according to last name.

Figure 7:
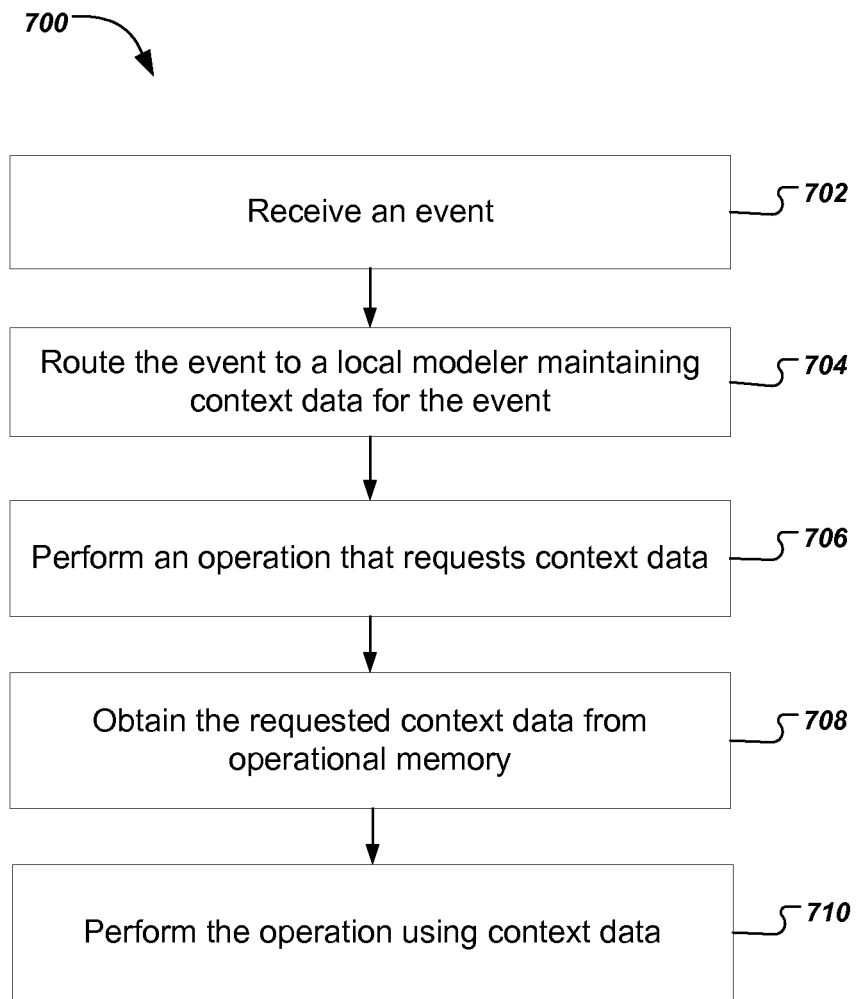
FIG. 7 is a flow chart of an example process for processing an event stream using context data.

FIG. 7 is a flow chart of an example process 700 for processing an event stream using context data. The process 700 will be described as being performed by an appropriately programmed system of one or more computers, e.g., the system 600.

The system receives an event included in an event stream (702). The system can receive the event stream that includes the event over a network, e.g., the Internet.

The system receives the event at a routing node, e.g., routing node 604, and routes the event to a particular local modeler, e.g., local modeler 610a (step 704). The event is routed according to where context data needed for processing the event is likely to be maintained.

In some implementations the event can be routed by performing a hashing process on information included in the event, e.g., a routing key. The routing key can identify a particular type of information included in the event, e.g., a name, a telephone number, an address, with each type of information identified as a key in a key-value pair included in the event. After performing the hashing process, a value can be obtained, e.g., by hashing the routing key, that identifies the partition of context data, e.g., the value can be mapped to an identifier of the partition. For instance, the hashing process can result in a value, and the system can compute the modulus of the value and a value identifying a number of local modelers. The result of the computation is a modeler number, e.g., a number that can range from 0 to one minus the number of local modelers. The system can provide the event to a particular local modeler identified by the modeler number.

In some implementations events can include a data affinity hint, which the system can use to determine a partition of context data, and a local modeler maintaining that partition of context data. The data affinity hint can identify a type of context data that is needed to process the event. The routing node can obtain information included in the event, e.g., a routing key corresponding to the type of context data, and perform a hashing process on the information. The routing node can obtain a value from the hashing process and obtain information identifying a partition of the type of context data mapped to the value.

The system performs an operation that requests context data for the event (706). For instance, the event can represent a telephone call being placed from a particular phone number, and the operation can request access to a user account number associated with the particular phone number. In some implementations, the local modeler executes the operations in a same operating system process, e.g., a JAVA virtual machine process, that also maintains a partition of context data stored in operational memory.

The system obtains the requested context data from operational memory (708). Because the context data is maintained in operational memory, the system can quickly obtain the requested context data, avoid data locking issues and race conditions, and avoid having to call and obtain context data from an outside database. In this way the time to fetch context data is reduced, e.g., in comparison with fetching from an outside computer system over a network.

The system performs the operation using the context data (710). The local modeler performs the operation on the event using the context data. In performing the operation on the event, the local modeler can modify the event based on the particular operation of the functional module. Some operations may also modify the context data, in which case, when the system accesses the context data for a subsequent event, the system will retrieve the modified context data.

Figure 8:
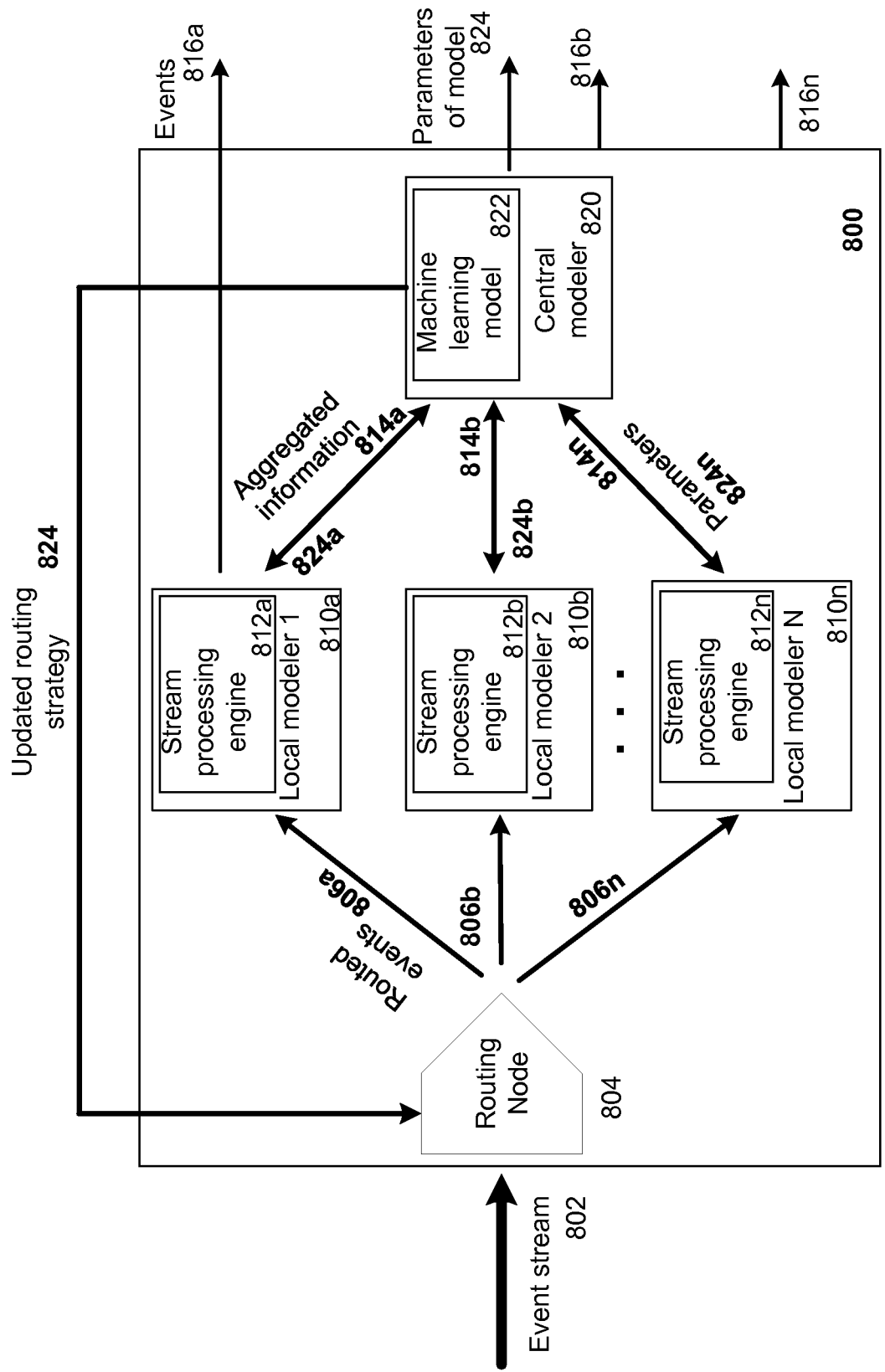
FIG. 8 illustrates an example system for processing an event stream and updating a routing strategy during processing.

FIG. 8 illustrates an example system 800 for processing an event stream and updating a routing strategy during processing. The system 800 includes multiple local modelers 810a-n of a stream processing system in communication with a central modeler 820, which are described above with reference to FIG. 1 and FIG. 6. The system 800 also includes a routing node 804, that receives an event stream 802 and routes each event in the event stream according to a routing strategy.

The routing node 804 receives an event stream 802 and provides each event to a particular local modeler 810a-n according to the routing strategy. A routing strategy is a process that the routing node 804 performs to receive an event, and identify a local modeler to receive the event. The routing strategy can initially be identified by a developer, e.g., the routing node can provide events randomly to local modelers, by performing a round-robin process of local modelers, or by determining a local modeler storing context data needed to process an event, e.g., as described in reference to FIG. 7.

As described above, e.g., in reference to FIG. 1 and FIG. 6, the local modelers 810a-n receive routed events 806a-n, and perform operations that includes aggregating information associated with each event. The local modelers 806a-n provide aggregated information 814a-n to a central modeler 820, which uses the aggregated information to determine parameters of a machine learning model 822.

In the process of determining parameters of the machine learning model 822, the central modeler 820 can determine that local modelers should receive events based on particular information included in each event. That is, the central modeler 820 can determine that respective local modelers should receive specific sub-populations of the event stream 802, and aggregate information associated with the sub-population. Upon a positive determination, the central modeler 820 updates the routing strategy 824 of the routing node 804, e.g., the central modeler 820 sends information 824 specifying that events should be routed by one or more data elements in a data tuple defining each event. The central modeler 820 then receives aggregated information from local modelers aggregating sub-populations of the event stream 802, and determines respective parameters of a machine learning model for each sub-population.

The updated routing strategy 824 provided to the routing node 804 can be one or more rules that identify a process to route events. For instance, the rules can identify that depending on the value of a particular piece of information included in events, e.g., a value mapped to a particular key, the event should be routed to particular local modelers. The rules can be represented as a series of "if then" statements, e.g., conditioned on information included in events, that ultimately identify a local modeler to receive an event. Additionally, the rules can be represented as a tree.

To determine sub-populations of the event stream, the central modeler 820 can perform a clustering process, e.g., a k-means clustering process, or a mixture model process, e.g., a Gaussian mixture model process, on the event stream, and identify clusters of events or mixtures of events each centered around one of a multiple of means. In some implementations, the central modeler 820 can update the routing strategy of the routing node 804 by varying the routing strategy to a slight degree. The central modeler 820 then can determine whether the clustering process determines clusters that better classifies events, e.g., each cluster includes events that differ by particular information included in each event. If so, the central modeler 820 can continue updating the routing strategy until it determines that the routing strategy best separates events into clusters. For example, the central modeler 820 can determine that events should be routed by a location identified in an event, e.g., events each with information identifying San Francisco should be routed differently than events each with information identifying Los Angeles based on identifying clusters of events with each cluster including events with the same location.

Additionally, to determine sub-populations the central modeler 820 can obtain information, e.g., from a configuration file, identifying one or more pre-defined configurations. Each configuration identifies a particular routing strategy, and the central modeler 820 can execute each routing strategy to determine whether the configuration determines clusters of events better than a different configuration. Upon determining a configuration that determines clusters of events the best, the central modeler 820 can provide information to the routing node 820 to route events according to the configuration.

In some implementations, the local modelers 810a-n store context data related to events, described above with reference to FIG. 6. In these implementations, upon updating the routing strategy, each local modeler has to obtain context data related to events routed to them in the updated routing strategy. The central modeler 820 can determine, from the updated routing strategy, context data that should be stored in operational memory of each local modeler. For instance, the central modeler 820 can access a mapping of particular information included in events, and where context data related to that information is stored. After determining, each local modeler can obtain the context data from one or more other local modelers, or from storage systems that have all information replicated.

Figure 9:
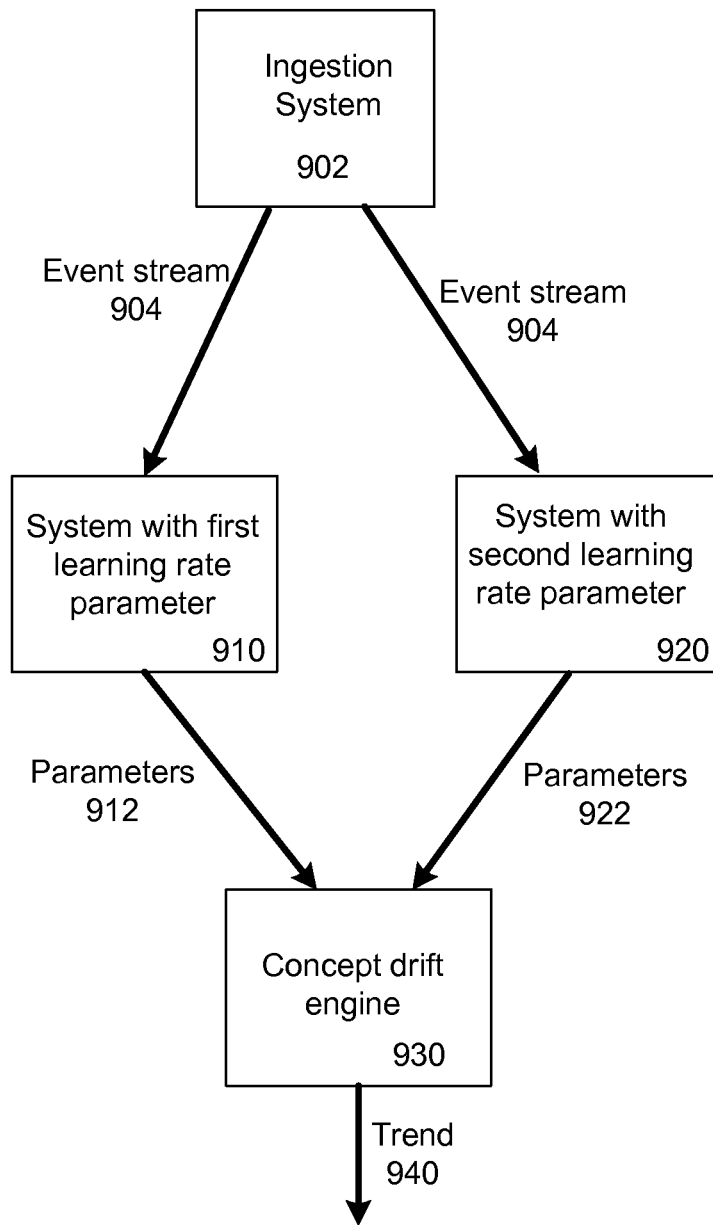
FIG. 9 illustrates an example system for determining a sudden trend or change in trend in an event stream.

FIG. 9 illustrates an example system for processing an event stream to determine a sudden trend or change in trend in the event stream. A sudden trend or change in trend can be identified from a sudden shift in the parameters of a machine learning model. In some implementations the processing can determine a break-point. To identify a sudden trend or change in trend, a first system 910 for determining a first set of parameters of a machine learning model, e.g., a system like the system 100 described in reference to FIG. 1, and a second system 920 for determining a second set of parameters of the same machine learning model, e.g., another system like the system 100 described in reference to FIG. 1, are used.

Each of the two systems determines respective parameters of the machine learning model by receiving a same event stream 904, and weighting, using a time stamp of each event, information associated with the event stream 904 while aggregating information. Each of the two systems weights information differently, e.g., one system 910 can weight older events higher, and the second system 920 can weight newer events higher.

A learning rate parameter specifies one or more weights to be applied to aggregated information associated with events. The learning rate parameter specifies a function, e.g., a linear or non-linear function, that outputs a weight to be applied to information associated with an event given a particular time stamp of the event. In this way older events can be entirely discounted.

An ingestion system 902 receives an event stream 904, and provides the event stream 904 to system 910 with a first learning rate parameter and to system 920 with a second learning rate parameter.

A developer can specify a respective learning rate parameter for each system when identifying a workflow, as described above with reference to FIG. 4. The developer can identify the use of local modelers that include a learning rate parameter, and specify a learning rate parameter, e.g., a function, in a configuration file defining the workflow.

The two systems 910 and 920 receive the event stream 904, and aggregate information associated with the event stream 904. During aggregation of information associated with each event, e.g., by respective local modelers of each system, each system applies a respective learning rate parameter to the aggregated information, and weights the information based on time stamps of events. In this way each system can discount older events, weight older events greater, weight newer events higher, and so on.

After aggregating information, respective central modelers of each system determine parameters of a machine learning model. Each system determines parameters of the same machine learning model, differing only in the learning rate parameter of each system. In some implementations, parameters 912 and parameters 922 represent the parameters of a machine learning model at respective points in time, e.g., depending on the learning rate parameter.

Parameters from each system, e.g., parameters 912 and parameters 922, are provided to a concept drift engine 930. The concept drift engine 930 can be software executing on a system that executes on a system executing systems 910 and 920. In some implementations the concept drift engine 930 can execute on an outside system connected to the two systems 910 and 920 over a network, e.g., the Internet.

The concept drift engine 930 receives parameters 912 and 922, and determines a difference between the parameters. In determining a difference, the concept drift engine 930 can determine a sum of a difference between each particular parameter of the parameters 912 and 922, e.g., the $L_1$-norm. In some other implementations the concept drift engine 930 can determine the $L_2$-norm of each set of parameters.

The concept drift engine 930 determines whether the difference is greater than a threshold, and if so generates information identifying a trend or change in trend in the event stream. The information identifying a trend or change in trend can include an identification of a parameter from parameters 912 and parameters 922 that are different at greater than a threshold percentage. This information can then be provided to a user device. For instance, each event can identify a particular user's interaction with services provided by a system. The concept drift engine 930 can determine that the events of the event stream suddenly include user's making use of a particular service. For instance, parameters 912 and parameters 922 can each represent usage models of the services of the system up until different points in time. If the concept drift engine 930 detects a sudden change in the parameters, e.g., a change in the derivative of the parameters of the machine learning model, the concept drift engine 930 can provide information identifying the sudden change and an indication that malware has been installed on user systems.

Embodiments of the subject matter and the operations or actions described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

Some systems and components may be characterized in this specification as being "configured to" or "operable to" perform particular operations or actions. For a computer system, this means that the system has installed on it software, firmware, hardware, or a combination of them that in operation cause the system to perform the particular operations or actions. For one or more computer programs, this means that the one or more programs include instructions that, when executed by data processing apparatus, cause the apparatus to perform the particular operations or actions.

The term "data processing apparatus" refers to data processing hardware and encompasses all kinds of physical apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, e.g., a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Control of the various systems described in this specification, or portions of them, can be implemented in a computer program that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, trackball, or touchpad, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
receiving an event stream of events by a plurality of first local modelers of a stream processing system comprising one or more computers, wherein each first local modeler receives a respective portion of the events;
processing, by each first local modeler, events received by the first local modeler, as the events are received, including (i) computing aggregated information by aggregating respective information that is associated with the events when received by the first local modeler, (ii) using a machine learning model stored in the first local modeler, scoring the events received by the first local modeler in parallel with computing the aggregated information, and (iii) forwarding the scored events for further processing wherein the plurality of first modelers forward scored events to second local modelers or to a routing node that rotes events to second local modelers, wherein second local modelers are local modelers that are not in the plurality of first local modelers;
providing, by one or more of the first local modelers to a first central modeler of the stream processing system, the respective aggregated information computed by the one or more first local modelers, wherein each of the local modelers and the central modeler is implemented on a respective separate virtual machine or computing system in communication with respective virtual machine or computing systems of other modelers;

computing, by the first central modeler, machine learning model parameters of a first machine learning model using the respective aggregated information computed by each respective first local modeler of the plurality of first local modelers;

providing, by the first central modeler to each first local modeler of the plurality of first local modelers, the machine learning model parameters of the first machine learning model computed by the first central modeler; and updating the machine learning model stored in each first local modeler with the machine learning model parameters of the first machine learning model computed by the first central modeler and then using the updated machine learning model, by each first local modeler, in scoring events subsequently received by each first local modeler;

wherein each first local modeler is implemented on a respective virtual machine or a respective system of one or more computers that is separate from other virtual machines or other systems of one or more computers implementing the other first local modelers of the plurality of first local modelers, wherein the first local modelers receive events from a router that is an ingestion system separate from the first local modelers of the plurality of first local modelers, and wherein the central modeler is implemented as a respective system of one or more computers that is separate from the systems implementing the first local modelers of the plurality of first local modelers and separate from the router.

2. The method of claim 1, wherein:
providing the respective aggregated information to the first central modeler comprises providing the respective aggregated information asynchronously to the first central modeler.

3. The method of claim 1, wherein providing the respective aggregated information generated by one or more of the first local modelers comprises determining, by each local modeler of the first local modelers, that the local modeler has processed a threshold number of events and then as a consequence providing aggregated information generated by the local modeler to the first central modeler.

4. The method of claim 1, wherein the first central modeler is one of a plurality of central modelers.

5. The method of claim 1, further comprising:
receiving, by the first central modeler, data specifying a learning program for determining parameters of the first machine learning model from aggregated information,
wherein computing, by the first central modeler, the machine learning model parameters comprises executing the learning program using the aggregated information received by the first central modeler.

6. The method of claim 1, further comprising:
providing, by the first central modeler, the machine learning model parameters of the first machine learning model to a second central modeler of the stream processing system.

7. The method of claim 6, further comprising:
receiving, by the second central modeler, first machine learning model parameters of the first machine learning model from the first central modeler;

obtaining, by the second central modeler, external data; and determining, by the second central modeler, second machine learning model parameters of a second machine learning model using the external data and the first machine learning model parameters received from the first central modeler.

8. A stream processing system comprising:
one or more computers and one or more storage devices storing instructions that are operable, when executed by the one or more computers, to cause the one or more computers to implement a plurality of first local modelers and a first central modeler,
wherein each first local modeler of the plurality of first local modelers is configured to perform operations comprising:
receiving a respective portion of events in an event stream of events,
processing events received by the first local modeler, as the events are received, including (i) computing aggregated information by aggregating respective information that is associated with the events when received by the first local modeler, (ii) using a machine learning model stored in the first local modeler, scoring the events received by the first local modeler in parallel with computing the aggregated information, and (iii) forwarding the scored events for further processing, wherein the plurality of first modelers forward scored events to second local modelers or to a routing node that routes events to second local modelers, wherein second local modelers are local modelers that are not in the plurality of first local modelers; and
providing to the first central modeler of the stream processing system, the respective aggregated information computed by the first local modeler, wherein each of the local modelers and the central modeler is implemented on a respective separate virtual machine or computing system in communication with respective virtual machine or computing systems of the modelers;

wherein the first central modeler is configured to perform operations comprising:
computing machine learning model parameters of a first machine learning model using the respective aggregated information computed by each respective first local modeler of the plurality of first local modelers,
providing to each first local modeler of the plurality of first local modelers, the machine learning model parameters of the first machine learning model computed by the first central modeler, and
updating the machine learning model stored in each first local modeler with the machine learning model parameters of the first machine learning model computed by the first central modeler and then using the updated machine learning model in scoring events subsequently received by each first local modeler;

wherein each first local modeler is implemented on a respective virtual machine or a respective system of one or more computers that is separate from other virtual machines or other systems of one or more computers implementing the other first local modelers of the plurality of first local modelers, wherein the first local modelers receive events from a router that is an ingestion system separate from the first local modelers of the plurality of first local modelers, and wherein the central modeler is implemented as a respective system of one or more computers that is separate from the systems implementing the first local modelers of the plurality of first local modelers and separate from the router.

9. The system of claim 8, wherein the first central modeler is configured to perform operations comprising:
receiving data specifying a learning program for determining parameters of the first machine learning model from aggregated information,
wherein computing the machine learning model parameters comprises executing the learning program using the aggregated information received by the first central modeler.

10. The system of claim 8, wherein the first central modeler is configured to perform operations comprising:
providing the machine learning model parameters of the first machine learning model to a second central modeler of the stream processing system.

11. The system of claim 10, wherein the second central modeler is configured to perform operations comprising:
receiving first machine learning model parameters of the first machine learning model from the first central modeler;
obtaining external data; and
determining second machine learning model parameters of a second machine learning model using the external data and the first machine learning model parameters received from the first central modeler.

12. A computer program product, encoded on one or more non-transitory computer storage media, comprising instructions that when executed by one or more computers cause the one or more computers to implemented a plurality of first local modelers of a stream processing system and to implemented a first central modeler of the stream processing system, wherein each of the local modelers and the central modeler is implemented on a respective separate virtual machine or computing system in communication with respective virtual machines or computing systems of other modelers, and the instructions when executed cause the one or more computers to perform operations comprising:
receiving an event stream of events by the plurality of first local modelers, wherein each first local modeler receives a respective portion of the events;
processing, by each first local modeler, events received by the first local modeler, as the events are received, including (i) computing aggregated information by aggregating respective information that is associated with the events when received by the first local modeler, (ii) using a machine learning model stored in the first local modeler, scoring the events received by the first local modeler in parallel with computing the aggregated information, and (iii) forwarding the scored events for further processing, wherein the plurality of first modelers forward scored events to second local modelers or to a routing mode that routes events to second local modelers, wherein second local modelers are local modelers that are not in the plurality of first local modelers;
providing, by one or more of the first local modelers to a first central modeler of the stream processing system, the respective aggregated information computed by the one or more first local modelers;
computing, by the first central modeler, machine learning model parameters of a first machine learning model using the respective aggregated information computed by each respective first local modeler of the plurality of first local modelers; and
providing, by the first central modeler to each first local modeler of the plurality of first local modelers, the machine learning model parameters of the first machine learning model computed by the first central modeler; and
updating the machine learning model stored in each first local modeler with the machine learning model parameters of the first machine learning model computed by the first central modeler and then using the updated machine learning model in scoring events subsequently received by each first local modeler;
wherein each first local modeler is implemented on a respective virtual machine or a respective system of one or more computers that is separate from other virtual machines or other systems of one or more computers implementing the other first local modelers of the plurality of first local modelers, wherein the first local modelers receive events from a router that is an ingestion system separate from the first local modelers of the plurality of first local modelers, and wherein the central modeler is implemented as a respective system of one or more computers that is separate from the systems implementing the first local modelers of the plurality of first local modelers and separate from the router.

13. The computer program product of claim 12, wherein providing the respective aggregated information to the first central modeler comprises providing the respective aggregated information asynchronously to the first central modeler.

14. The computer program product of claim 12, wherein providing the respective aggregated information generated by one or more of the first local modelers comprises determining, by each local modeler of the first local modelers, that the local modeler has processed a threshold number of events and then as a consequence providing aggregated information generated by the local modeler to the first central modeler.

15. The computer program product of claim 12, wherein the first central modeler is one of a plurality of central modelers.

16. The computer program product of claim 12, wherein the operations further comprise:
receiving, by the first central modeler, data specifying a learning program for determining parameters of the first machine learning model from aggregated information,
wherein computing, by the first central modeler, the machine learning model parameters comprises executing the learning program using the aggregated information received by the first central modeler.

17. The computer program product of claim 12, wherein the operations further comprise:
providing, by the first central modeler, the machine learning model parameters of the first machine learning model to a second central modeler of the stream processing system.

18. The computer program product of claim 17, wherein the operations further comprise:
receiving, by the second central modeler, first machine learning model parameters of the first machine learning model from the first central modeler;
obtaining, by the second central modeler, external data; and determining, by the second central modeler, second machine learning model parameters of a second machine learning model using the external data and the first machine learning model parameters received from the first central modeler.

\* \* \* \* \*